US011182054B2

(12) United States Patent
Bordoloi et al.

(10) Patent No.: US 11,182,054 B2
(45) Date of Patent: Nov. 23, 2021

(54) WEB-BROWSER PLUGIN FOR CONSOLIDATING REQUESTED DISAGGREGATED INFORMATION

(71) Applicant: COUPANG CORP., Seoul (KR)

(72) Inventors: Bijoy Bordoloi, Seattle, WA (US); Ankit Arora, Seattle, WA (US); Khoa Nguyen, Seattle, WA (US); Chang Hyun Lee, Seoul (KR); Suk Min Ahn, Seoul (KR); Prithvis Mohanty, Seattle, WA (US)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/832,669

(22) Filed: Mar. 27, 2020

(65) Prior Publication Data
US 2021/0303109 A1    Sep. 30, 2021

(51) Int. Cl.
G06F 3/0482    (2013.01)
H04L 29/08    (2006.01)

(52) U.S. Cl.
CPC ............ *G06F 3/0482* (2013.01); *H04L 67/02* (2013.01); *H04L 67/26* (2013.01)

(58) Field of Classification Search
None
See application file for complete search history.

(56) References Cited

U.S. PATENT DOCUMENTS

| 10,262,356 | B2* | 4/2019 | Davis | G06Q 30/0639 |
| 10,515,384 | B2* | 12/2019 | Bruno | G06Q 30/0239 |
| 2002/0038368 | A1* | 3/2002 | Kojima | G06F 16/9577 |
| | | | | 709/225 |

(Continued)

FOREIGN PATENT DOCUMENTS

| CN | 103646023 A | 3/2014 |
| KR | 1020020028526 | 4/2002 |

(Continued)

OTHER PUBLICATIONS

Notice of Preliminary Rejection in counterpart Korean Patent Application No. 10-2020-0055736, dated Dec. 21, 2020 (12 pages).

(Continued)

*Primary Examiner* — Ryan F Pitaro
(74) *Attorney, Agent, or Firm* — Finnegan, Henderson, Farabow, Garrett & Dunner, LLP

(57) ABSTRACT

Disclosed embodiments provide systems and methods implementing a web-browser plugin for providing requested information. A method for providing requested information comprises receiving, as a user interaction on a graphical user interface, a request to provide data associated with a target object presented on a web page, retrieving an object identifier associated with the target object based on a determined data accessibility, the object identifier incorporated in the web page, transmitting the retrieved object identifier to a plurality of systems storing data associated with the target object, the plurality of systems configured to provide data corresponding to the received object identifier in response to the received object identifier, receiving data responsive to transmitting the retrieved object, modifying the web page to include the received data, and presenting the web page on the graphical user interface.

20 Claims, 12 Drawing Sheets

(56) References Cited

U.S. PATENT DOCUMENTS

| | | | |
|---|---|---|---|
| 2002/0087371 A1 | 7/2002 | Abendroth | |
| 2006/0173755 A1* | 8/2006 | Mihara | G06F 16/258 |
| | | | 705/27.1 |
| 2008/0172606 A1* | 7/2008 | White | G06F 16/3334 |
| | | | 715/254 |
| 2010/0325122 A1* | 12/2010 | Yassin | G06F 16/9535 |
| | | | 707/759 |
| 2014/0032364 A1* | 1/2014 | Shepherd | G06Q 30/0609 |
| | | | 705/26.35 |
| 2014/0200955 A1* | 7/2014 | Whiteman | G06Q 30/0269 |
| | | | 705/7.29 |
| 2014/0344670 A1* | 11/2014 | Cathey | G06F 16/9535 |
| | | | 715/234 |
| 2015/0317719 A1 | 11/2015 | Berg et al. | |
| 2015/0363858 A1* | 12/2015 | Kleinhandler | G06Q 30/0627 |
| | | | 705/26.63 |
| 2016/0300295 A1* | 10/2016 | Westphal | G06Q 30/0641 |
| 2017/0148046 A1* | 5/2017 | Akbarpour Mashadi | |
| | | | G06Q 30/0239 |
| 2017/0249393 A1 | 8/2017 | Nair et al. | |
| 2017/0344218 A1* | 11/2017 | Jann | G06F 3/0482 |
| 2018/0081976 A1* | 3/2018 | Dejuan | G06F 16/9535 |
| 2018/0173748 A1* | 6/2018 | Rasdale | G06F 16/2365 |
| 2018/0260258 A1* | 9/2018 | Wester | G06F 9/548 |
| 2018/0305905 A1* | 10/2018 | Carey | E03B 7/074 |
| 2019/0012316 A1* | 1/2019 | Bahrie | G06F 16/2428 |
| 2019/0180353 A1* | 6/2019 | DeLuca | G06Q 30/0282 |
| 2019/0362101 A1* | 11/2019 | Fisse | H04L 63/0421 |

FOREIGN PATENT DOCUMENTS

| | | |
|---|---|---|
| KR | 1020150005436 | 12/2015 |
| TW | M541613 | 5/2017 |
| TW | 201839688 A | 11/2018 |

OTHER PUBLICATIONS

Office Action and Search Report in counterpart Taiwan Patent Application No. 1101000265, dated Oct. 15, 2021 (11 pages).

\* cited by examiner

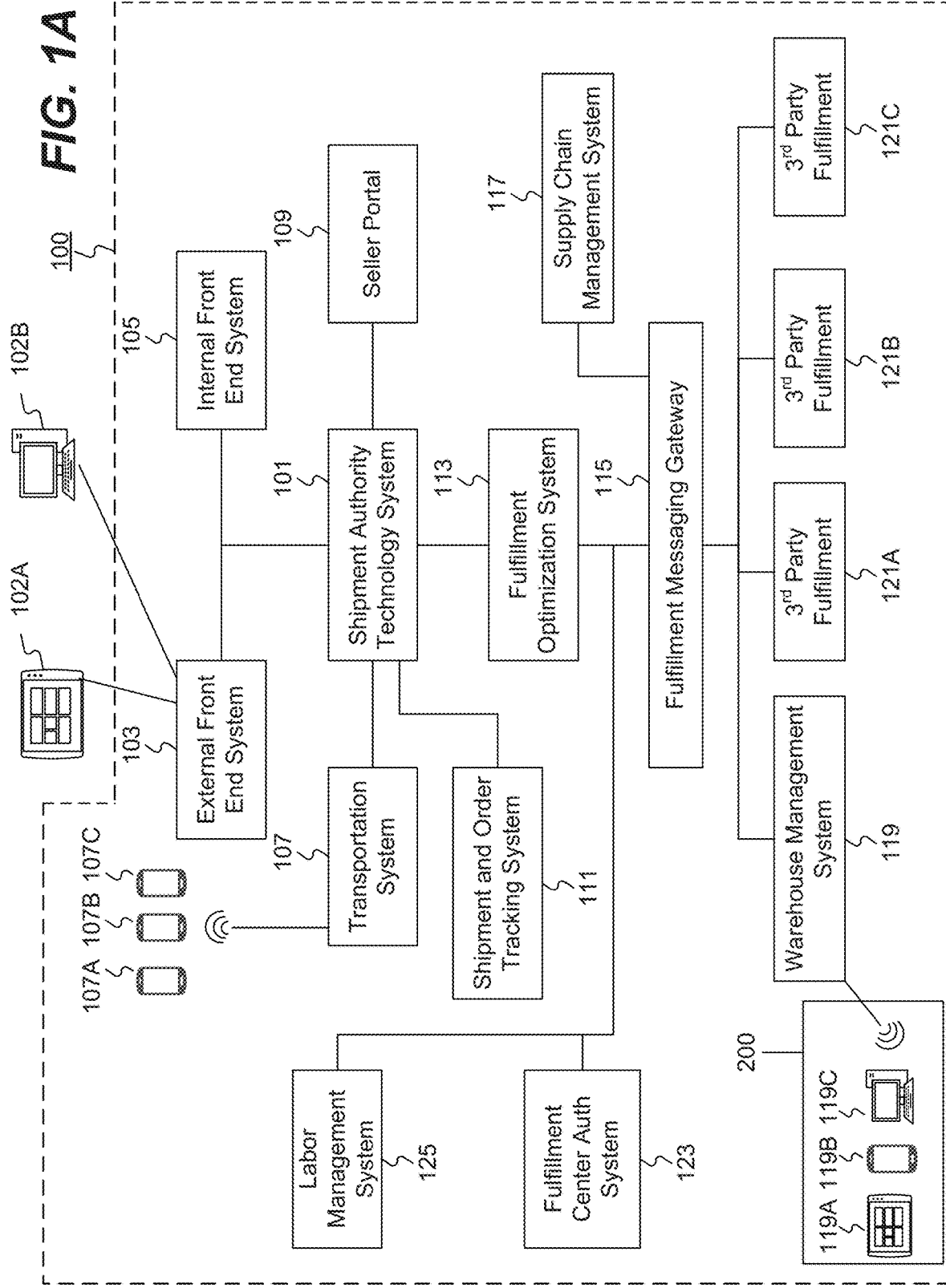

WEB-BROWSER PLUGIN FOR CONSOLIDATING REQUESTED DISAGGREGATED INFORMATION

TECHNICAL FIELD

The present disclosure generally relates to systems and methods for implementing a web-browser plugin for providing requested information. In particular, embodiments of the present disclosure relate to inventive and unconventional systems relate to computer-implemented systems, methods, and web-browser plugins for conveniently providing information associated with a target object presented in a web page on a web browser.

BACKGROUND

Conventional electronic systems providing online commercial transactions store data associated with a product of the online commercial transaction in many systems. For example, inventory data and sales data, associated with a product, are stored in different systems. Conventional electronic systems may provide product data to an employer or an employee associated with the online commercial transactions, but at the cost of inconvenience. For example, an employer or an employee must know a product identifier of a product to acquire product data from different systems while the product is readily available on a web page processing online commercial transaction. Moreover, he may have to login to different systems to acquire necessary product data while some data may not be accessible based on his role and status.

Therefore, there is a need for improved methods and systems for providing information from disparate systems over a network.

SUMMARY

One aspect of the present disclosure is directed to a web-browser plugin for providing requested information, comprising a tangible storage medium readable by a processing unit and storing instructions for execution by the processing unit for performing a method. The method may comprise receiving, from a user device, a request to provide data associated with a target object presented on a web page, accessing a set of attributes associated with a user of the user device, determining a data accessibility of the user device based on the received set of attributes, and retrieving an object identifier associated with the target object based on the determined data accessibility, the object identifier incorporated in the web page. The operations may further comprise transmitting the retrieved object identifier to a plurality of systems storing data associated with the target object, the plurality of systems configured to provide data corresponding to the received object identifier in response to the received object identifier and providing the received data to the user device.

Another aspect of the present disclosure is directed to a method for providing information through a web-browser plugin. The method may comprise receiving, from a user device via a web-browser plugin, a request to provide data associated with a target object presented on a web page, accessing a set of attributes associated with a user of the user device, determining a data accessibility of the user device based on the received set of attributes, and retrieving an object identifier associated with the target object based on the determined data accessibility, the object identifier incorporated in the web page. The method may further comprise transmitting the retrieved object identifier to a plurality of systems storing data associated with the target object, the plurality of systems configured to provide data corresponding to the received object identifier in response to the received object identifier and providing the received data to the user device via the web-browser plugin.

Yet another aspect of the present disclosure is directed to a computer-implemented system for providing information through a web-browser plugin. The computer-implemented system may comprise one or more memory devices storing instructions and one or more processors configured to execute the instructions to perform operations. The operations may comprise receiving, from a user device via a web-browser plugin, a set of attributes associated with the user device and a request to provide data associated with a target object presented on a web page, determining a data accessibility of the user device based on the received set of attributes, and retrieving an object identifier associated with the target object based on the determined data accessibility, the object identifier incorporated in the web page. The operations may further comprise transmitting the retrieved object identifier to the first system and the second system, the first system and the second system configured to provide stored data corresponding to the received object identifier in response to the received object identifier, parsing the received set of attributes to select accessible data from the received data, the attributes comprise one or more indicators for selecting the accessible data, and providing the selected accessible data to the user device via the web-browser plugin.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

FIG. 5A depicts an exemplary interface providing requested information in the form of list by a web-browser plugin, consistent with the disclosed embodiments.

FIG. 5B depicts an exemplary interface providing detailed information associated with a target object, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to computer-implemented systems and methods configured for providing information through a web-browser plugin. The disclosed embodiments provide innovative technical features that enable acquiring secured product data associated with a product displayed on an online web page by using a web-browser plugin by an employer or an employee associated with the online commercial web page based on his accessibility. For example, the disclosed embodiments receive a set of attributes associated with a user device and a request to provide data associated with a target object presented on a web page, determine a data accessibility of the user device based on the received set of attributes, retrieve an object identifier associated with the target object based on the determined data accessibility, transmit the retrieved object identifier to a plurality of systems, wherein the plurality of systems are configured to provide data corresponding to the received object identifier, and provide the received data to the user device via a web-browser plugin implemented in the web page. Moreover, the disclosed embodiments may select data based on the received set of attributes before providing the data to the user device.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1C:
FIG. 1C depicts a sample Single Display Page (SDP) that includes a product and information about the product along with interactive user interface elements, consistent with the disclosed embodiments.
Figure 1D:
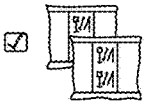
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3rd party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
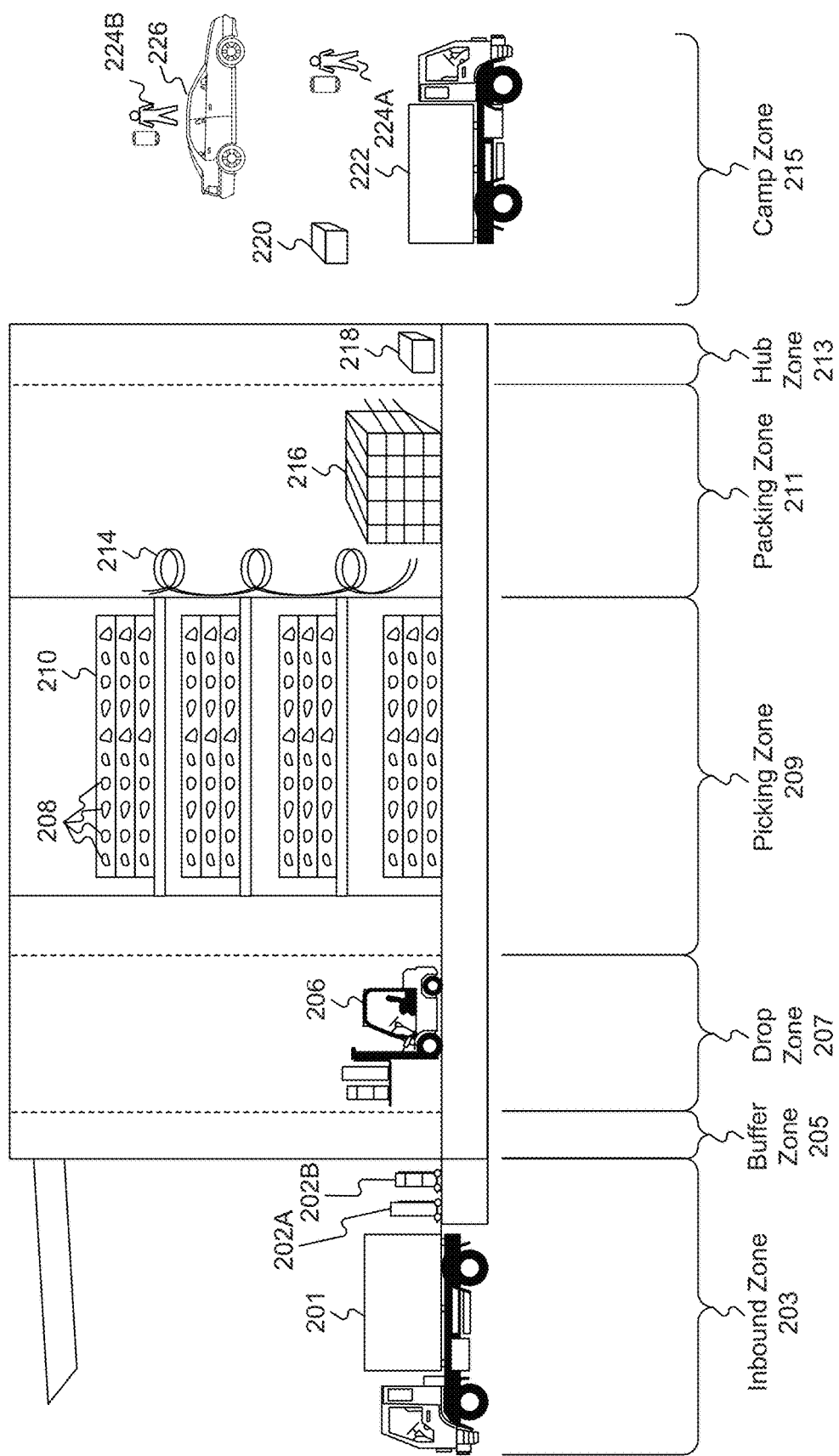
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

According to an aspect of the present disclosure, a web-browser plugin for providing information may be implemented as part of a tangible storage medium readable by a processing unit and storing instructions for execution by the processing unit for performing a method. The web-browser plugin may comprise a software component that adds a specific feature to an existing computer program such as a web browser displaying a web page. The web browser may provide services which the web-browser plugin can use, including a way for the web-browser plugin to register itself with the web browser and a protocol for the exchange of data with the web-browser plugin. In some embodiments, the web-browser plugin may operate one or more of external front end system 103 or internal front end system 105. The preferred embodiment comprises implementing the web-browser plugin to operate internal front end system 105 for providing information, but one of ordinary skill will understand that other implementations are possible.

Figure 3A:
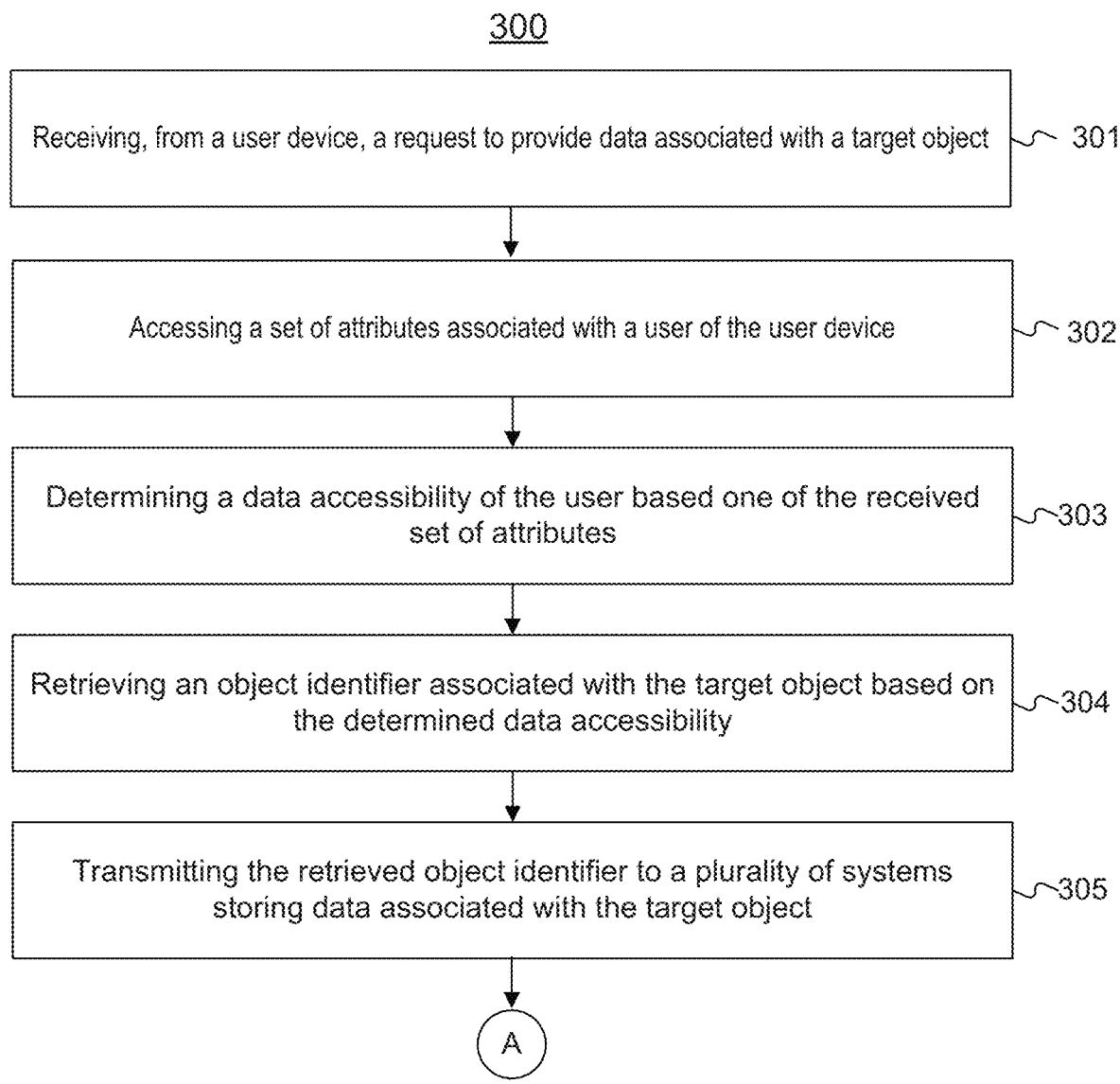
FIG. 3A is an exemplary flow chart of process for providing information through a web-browser plugin, consistent with the disclosed embodiments.

FIG. 3A is an exemplary flow chart of process 300 for providing information through a web-browser plugin, consistent with the disclosed embodiments. While FIG. 3A is described with respect to a web-browser plugin operating internal front end system 105, one of ordinary skill in the art will recognize that other configurations are possible. For example, a web-browser plugin may operate external front end system 103 or any other computer-implemented systems capable of performing processes described below.

In step 301, a web-browser plugin may receive, from a user device, a request to provide data associated with a target object presented on a web page. The user device may transmit the request when a user associated with the user device configures a web browser displayed on the user device. For example, a web browser may provide a web page (such as SDP in FIG. 1C or SDP 400 in FIG. 4) presenting a target object and a web-browser plugin (such as interactive user interface element 401 in FIG. 4), and a user device may configure the web-browser plugin to request information associated with the presented target object. The web-browser plugin may be presented in the form of a button that the user device can receive a press or a click on the button to request the information.

In step 302, the web-browser plugin may access a set of attributes associated with a user of the user device. The user associated with the user device may be an employer or an employee of an enterprise owning or operating system 100 of FIG. 1A. The set of attributes may vary based on a user's role, status or responsibilities in the enterprise. For example, if a user requesting object information manages an inventory, a set of attributes may provide inventory indicators and comprise permissions limited to inventory. By way of further example, if a user requesting object information manages sales, a set of attributes may provide sales indicators and comprise permissions limited to sales.

In some embodiments, a user device may incorporate a set of attributes associated with a user. For example, a web-browser plugin may automatically access a set of attributes from a user device when a user configures a web page to request target object data.

In another embodiment, a web-browser plugin may access a set of attributes associated with a user of the user device based on login credentials entered by the user. The login credentials, when properly entered, may provide a set of attributes associated with the login credentials. For example, a user may use any computing devices and enter his/her login credentials on a web browser. When the user is properly logged in, a web-browser plugin may access a set of attributes associated with the login credentials provided by the web browser.

In step 303, the web-browser plugin, by transmitting the set of attributes to internal front end system 105, may determine data accessibility of the user based on the received set of attributes. Internal front end system 105, in response to the received set of attributes, may determine data accessibility of the user. Data accessibility can be determined by parsing a permission incorporated in the received set of attributes. The received set of attributes may comprise a permission to access data stored in a variety of systems included in system 100 of FIG. 1A. In some embodiments, a permission can be limited to data stored in a specific system. For example, if a user manages inventory, his permission to access data associated with a target object may be limited to target object inventory data. While it is described that a permission can be limited to a specific system, it is appreciated that the permission may grant an access to one or more systems.

In step 304, the web-browser plugin may retrieve an object identifier associated with the target object based on the determined data accessibility in step 303 via the web browser. The object identifier may be incorporated in the web page (SDP). For example, external front end system 103 may receive information from systems or devices in system 100 (FIG. 1) to display and present a Single Detail Page (SDP) (e.g., FIG. 1C and SDP 400 in FIG. 4) and external front end system 103 may implement an object identifier in the SDP which can be accessed by a web browser displaying the SDP. If a data accessibility was determined to be granted for accessing data in one or more systems, the web-browser plugin may retrieve an object identifier incorporated in the web page (SDP). The object identifier may be in the form of a Stock-keeping unit (SKU) ID.

In step 305, the web-browser plugin, via internal front end system 105, may transmit the retrieved object identifier from step 304 to a plurality of systems storing data associated with the target object. The plurality of systems can be configured to provide data corresponding to the received object identifier in response to the received object identifier and update data daily. For example, internal front end system 105 may retrieve inventory data associated with a target object by transmitting an object identifier associated with the target object to FO system 113. As described above with respect to FIG. 1A, FO system 113 may store information describing where particular items are held or stored. In another example, internal front end system 105 may retrieve sales data associated with a target object by transmitting an object identifier associated with the target object to FO system 113. As described above with respect to FIG. 1A, FO system 113 may store information for customer orders from other systems (e.g., external front end system 103 and/or shipment and order tracking system 111). It is appreciated that internal front end system 105 may transmit the retrieved object identifier to other systems such as SAT system 101 storing order status and delivery status, SCM system 117 storing forecasted demand data, etc.

In some embodiments, internal front end system 105 may transmit the retrieved object identifier to one or more target systems storing data associated with the target object. The target systems can be determined by parsing the received set of attributes comprising one or more indicators and permissions. For example, if a permission or an indicator only grants access to data stored in FO systems 113, internal front end system 105 may only retrieve stored data associated with a target object from FO system 113. When internal front end system 105 receives data from the target systems, internal front end system 105 may provide the received data to the web-browser plugin, wherein the web-browser plugin formats the received data and provide the formatted data on the user device. (Exemplary data presented by the web-browser plugin are discussed further below with respect to FIGS. 4 and 5A-C.) The provided data may comprise a selectable element, wherein the selectable element generates another user interface providing detailed data when the user device configures the selectable element. The provided data may also comprise sales and inventory data presented in the form of list. The provided data may be displayed in any way that statistics can be visually displayed, such as in graph(s), chart(s), line(s), text, number(s), etc.

In another embodiment, the web-browser plugin, instead of determining target systems, may collect data from a plurality of systems and filter accessible data from the collected data based on a set of attributes via internal front end system 105. The web-browser plugin may begin executing the filtering process and processes for providing information in FIG. 3B.

Figure 3B:
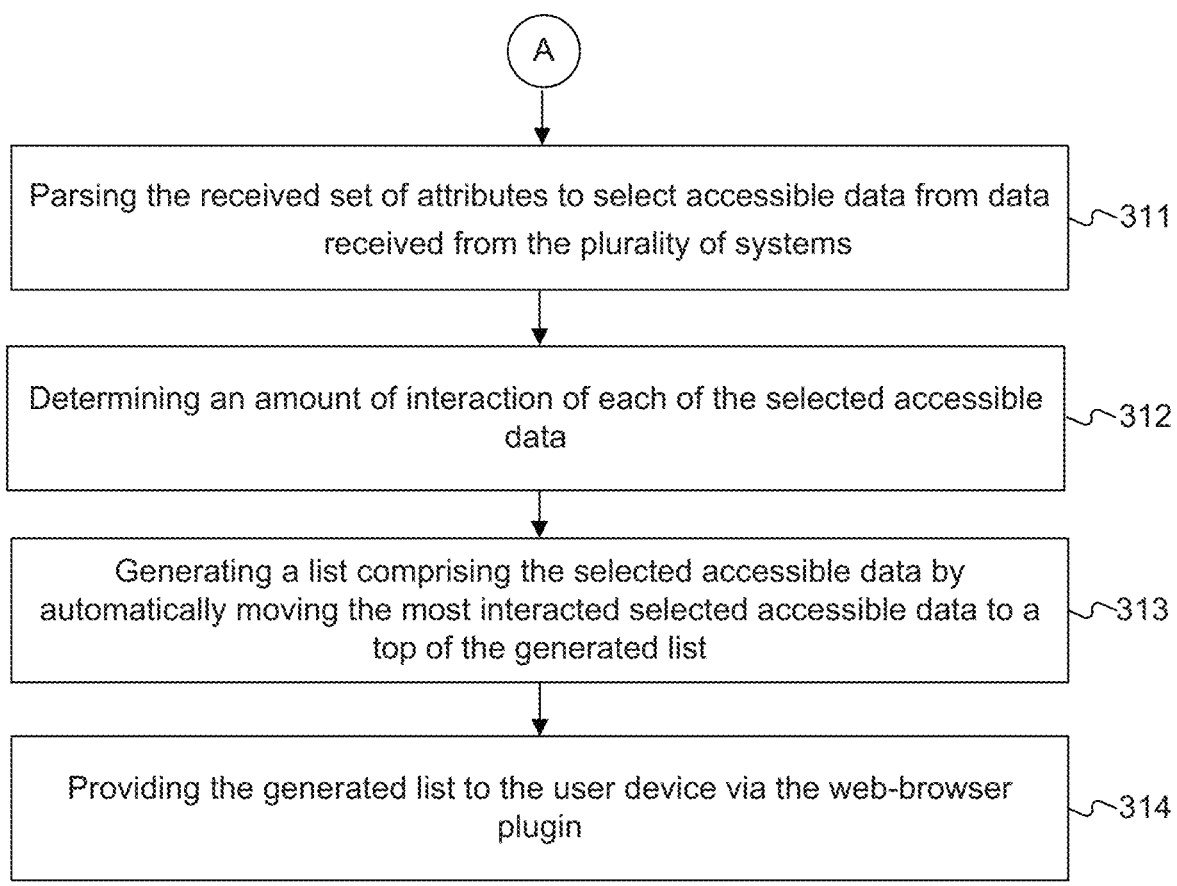
FIG. 3B depicts an exemplary process 310 for providing data received from a plurality of systems to a user device by the web-browser plugin, consistent with disclosed embodiments.

FIG. 3B depicts an exemplary process 310 for providing data received from a plurality of systems to a user device by the web-browser plugin, consistent with disclosed embodiments. As discussed above with respect to step 305 in FIG. 3A, internal front end system 105 may receive data from a plurality of systems by transmitting an object identifier to the plurality of systems. Process 310 may operate various processes to provide the received data to the user device. Referring to FIG. 3B, exemplary process 310 may begin at block 311.

In step 311, the web-browser plugin may parse the received set of attributes to select accessible data from the received data. The received set of attributes may comprise one or more indicators and permissions for selecting the accessible data. For example, if a permission or an indicator only grants access to data stored in FO systems 113, a web-browser plugin may only select received data from FO system 113 and remove other data. Systems may incorporate an origin indicator into data to enable the web-browser plugin to filter data based on its origin. When the web-browser plugin selects accessible data from the received data, in some embodiments, the web-browser plugin may format the selected accessible data and provide the formatted accessible data on the user device. (Exemplary data presented by the web-browser plugin are discussed further below with respect to FIGS. 4 and 5A-C.) The provided data may comprise a selectable element, wherein the selectable element generates another user interface providing detailed data when the user device configures the selectable element. The provided data may also comprise sales and inventory data presented in the form of list. The web-browser plugin may provide data in any way that statistics can be visually displayed, such as in graph(s), chart(s), line(s), text, number(s), etc. In another embodiment, the web-browser plugin may operate processes 312-314 before providing the selected accessible data to the user device.

In step 312, the web-browser plugin may use internal front end system 105 to determine an amount of interaction of each of the selected accessible data over a predetermined period of time. For example, a receive set of attributes may comprise interaction indicators providing an amount of interaction a user device or a user associated with the received set of attributes have with each of selected accessible data over a predetermined time.

In step 313, the web-browser plugin may generate a list comprising the selected accessible data by automatically moving the most interacted selected accessible data to a top of the generated list based on the determined amount of interaction. For example, when a user device or a user associated with the received set of attributes interacted mostly with sales data associated with a target object among selected accessible data, a web-browser plugin may generate a list and automatically move the sales data to the top of generated list.

In step 314, the web-browser plugin may provide the generated list from step 313 to the user device. The provided data may comprise a selectable element, wherein the selectable element generates another user interface providing detailed data when the user device configures the selectable element. The provided data may also comprise sales and inventory data. The web-browser plugin may provide data in any way that statistics can be visually displayed, such as in graph(s), chart(s), line(s), text, number(s), etc.

Figure 4:
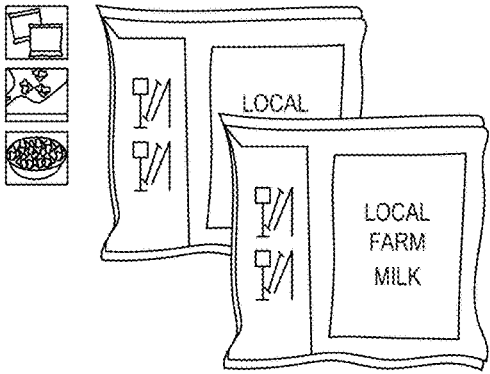
FIG. 4 depicts an exemplary web browser incorporating web-browser plugin and Single Display Page of FIG. 1C, consistent with the disclosed embodiments.

FIG. 4 depicts an exemplary web browser incorporating web-browser plugin 401 and Single Display Page of FIG. 1C, consistent with disclosed embodiments. Single display page (SDP) 400, similar to SDP depicted in FIG. 1C, may include a product and information about the product along with interactive user interface elements. The exemplary web browser may enable web-browser plugin to interact with SDP 400. Web-browser plugin 401 (represented in FIG. 4 as an interactive user interface element) may be configured to receive a click, a tap, or any other interaction from a user. Upon receiving the interaction, web-browser plug-in 401 may display data associated with a target object (the product included in SDP 400) by operating processes 300 and 310 described in FIGS. 3A and 3B. If a user or a user device has permissions to access one or more data associated with the target object, web-browser plugin 401 may provide an interface comprising data, such as the interface depicted in FIG. 5A.

Figure 5A:
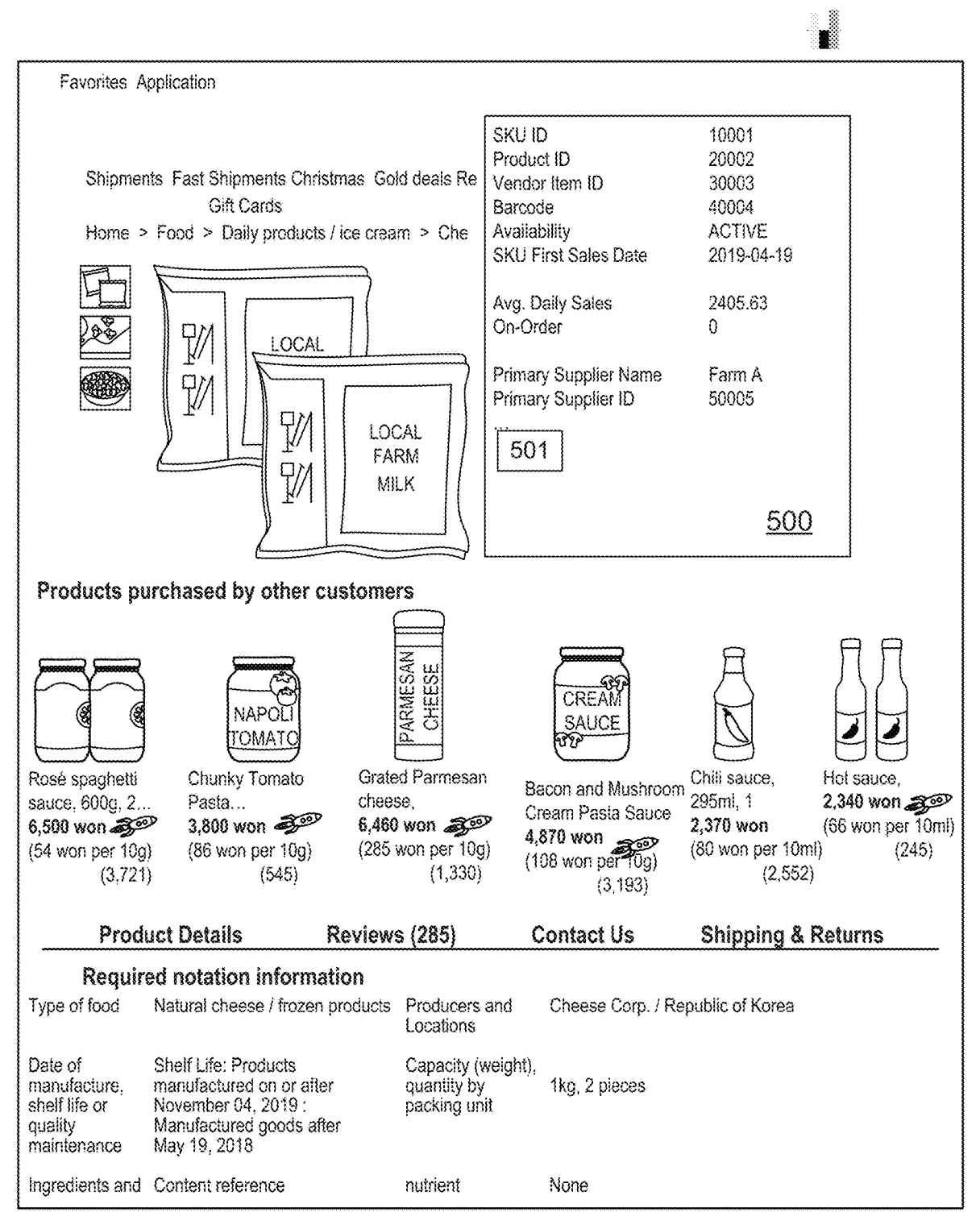

FIG. 5A depicts an exemplary interface 500 providing requested information in the form of list by a web-browser plugin, consistent with disclosed embodiments. In the exemplary interface 500, the web-browser plugin provides various information associated with a product displayed on the SDP, such as identifiers (SKU ID, Product ID, Vendor Item ID, and barcode), status, sales, and a supplier of the product. The information provided by the web-browser plugin is not limited to those in FIG. 5A. Interface 500 may also include button 501 which provides detailed data associated with the product when button 501 receives a tap or click. The web-browser plugin may provide an interface comprising the detailed data, such as the interface depicted in FIG. 5B.

Figure 5B:
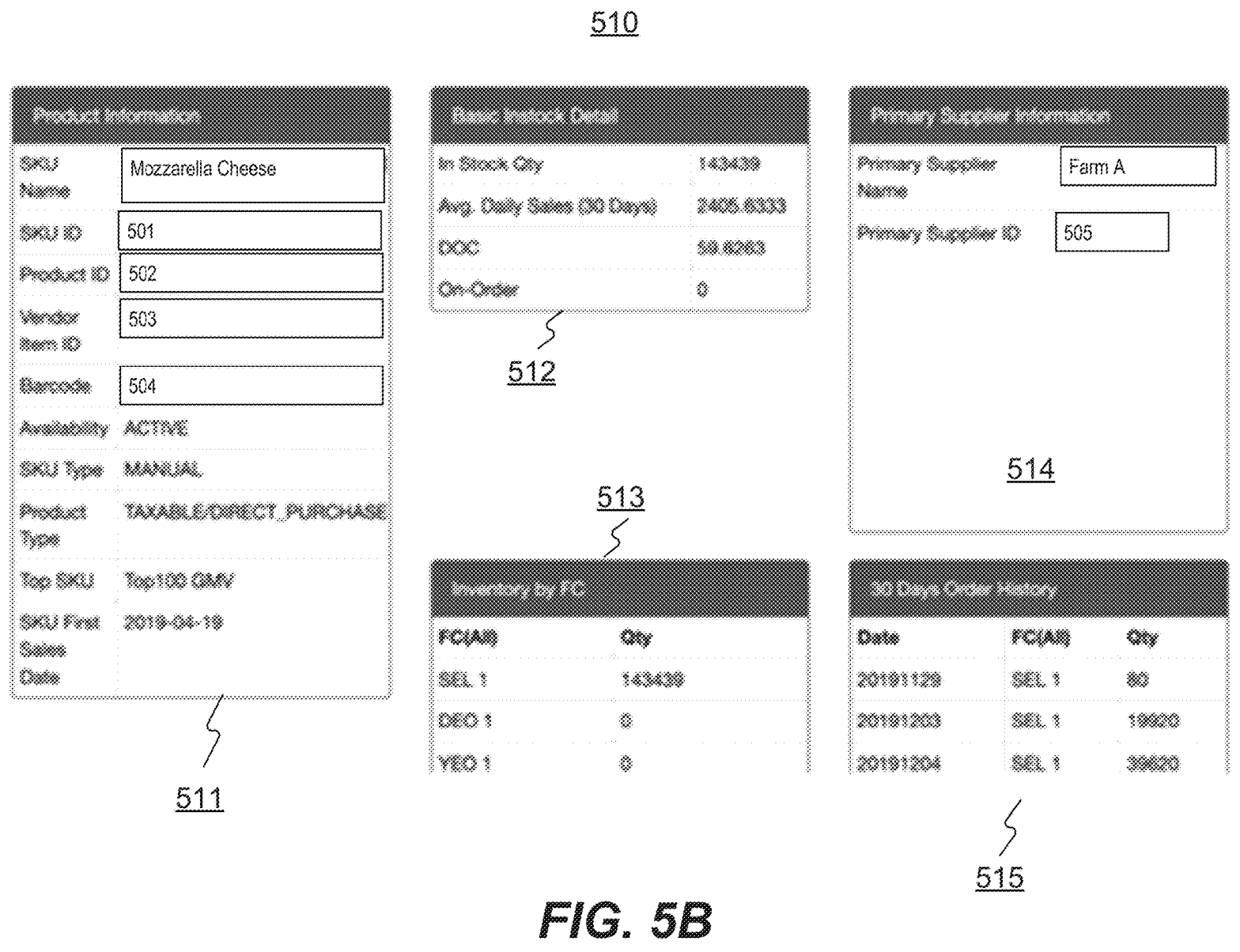

FIG. 5B depicts an exemplary interface 510 providing detailed information associated with a target object (product), consistent with disclosed embodiments. Exemplary interface 510 may comprise product information 501, instock detail 512, inventory status 513, primary supplier information 514, and order history 515. The detailed information provided is not limited to those in FIG. 5B.

Figure 5C:
FIG. 5C depicts another exemplary interface providing requested information in the form of graph by a web-browser plugin, consistent with the disclosed embodiments.

FIG. 5C depicts another exemplary interface 520 providing requested information in the form of graph by a web-browser plugin, consistent with disclosed embodiments. In the exemplary interface 520, the web-browser plugin provides inventory data 521 and sales data 522 associated with a product displayed in SDP in the form of graphs. The graphical representation of requested data enables a user associated with a user device to conveniently perceive his interests.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

One or more memory devices may store data and instructions used to perform one or more features of the disclosed embodiments. For example, memory may represent a tangible and non-transitory computer-readable medium having stored therein computer programs, sets of instructions, code, or data to be executed by processor. Memory may include, for example, a removable memory chip (e.g., EPROM, RAM, ROM, DRAM, EEPROM, flash memory devices, or other volatile or non-volatile memory devices) or other removable storage units that allow instructions and data to be accessed by processor.

One or more memory devices may also include instructions that, when executed by processor, perform operations consistent with the functionalities disclosed herein. Devices consistent with disclosed embodiments are not limited to separate programs or computers configured to perform dedicated tasks. For example, memory may include one or more programs to perform one or more functions of the disclosed embodiments.

One or more processors may include one or more known processing devices, such as a microprocessor from the Pentium™ or Xeon™ family manufactured by Intel™, the Turion™ family manufactured by AMD™, the "Ax" or "Sx" family manufactured by Apple™, or any of various processors manufactured by Sun Microsystems. The disclosed embodiments are not limited to any type of processor(s).

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system implementing a web-browser plugin for providing requested information, the system comprising:
   a tangible storage medium readable by a processing unit and storing instructions, and
   a processing unit configured to execute the instructions to perform a method comprising:
   receiving, as a user interaction on a graphical user interface, a request to provide data associated with a target object presented on a web page;
   accessing a set of attributes associated with a user of a user device;
   determining a data accessibility of the user based on the accessed set of attributes by parsing a permission incorporated in the received set of attributes;
   retrieving an object identifier associated with the target object based on the determined data accessibility, the object identifier incorporated in the web page;
   transmitting the retrieved object identifier to a plurality of systems storing data associated with the target object, the plurality of systems configured to provide data corresponding to the received object identifier in response to the received object identifier;
   receiving data responsive to transmitting the retrieved object;
   providing the received data to the user device implemented in the web page;
   parsing a permission incorporated in the accessed set of attributes to select accessible data from the received data, the attributes comprising one or more indicators for selecting the accessible data;
   filtering data based on the set of attributes;
   modifying the web page to include the filtered data; and
   presenting the web page on the graphical user interface.

2. The system of claim 1, wherein presenting the web page further comprises:
   parsing the accessed set of attributes to select accessible data from the received data, the attributes comprise one or more indicators for selecting the accessible data; and
   presenting the selected accessible data on the graphical user interface.

3. The system of claim 2, wherein presenting the selected accessible data further comprises:
   determining an amount of interaction of each of the selected accessible data over a predetermined period of time;
   generating a list comprising the selected accessible data by automatically moving selected accessible data to a top of the generated list based on the determined amount of interaction; and
   providing the generated list on the graphical user interface.

4. The system of claim 1, wherein the set of attributes comprises permissions to access data associated with the target object.

5. The system of claim 1, wherein the set of attributes comprises a status of the user.

6. The system of claim 1, wherein the plurality of systems storing data updates data daily.

7. The system of claim 1, wherein the modified web page comprises a selectable element, the selectable element generates another user interface providing detailed data when the user configures the selectable element.

8. The system of claim 1, wherein the modified web page comprises sales data associated with the object.

9. The system of claim 1, wherein the modified web page comprises inventory data associated with the object.

10. The system of claim 1, wherein the retrieved object identifier is transmitted to a plurality of systems via a computer-implemented system.

11. A method for providing requested information through a web-browser plugin, comprising:
    receiving, as a user interaction on a graphical user interface, a request to provide data associated with a target object presented on a web page;
    accessing a set of attributes associated with a user of a user device;
    determining a data accessibility of the user based on the accessed set of attributes by parsing a permission incorporated in the received set of attributes;

retrieving an object identifier associated with the target object based on the determined data accessibility, the object identifier incorporated in the web page;

transmitting the retrieved object identifier to a plurality of systems storing data associated with the target object, the plurality of systems configured to provide data corresponding to the received object identifier in response to the received object identifier;

receiving data responsive to transmitting the retrieved object;

providing the received data to the user device implemented in the web page;

parsing a permission incorporated in the accessed set of attributes to select accessible data from the received data, the attributes comprising one or more indicators for selecting the accessible data;

filtering data based on the set of attributes;

modifying the web page to include the filtered data; and presenting the web page on the graphical user interface.

12. The method of claim 11, wherein presenting the web page further comprises:

parsing the accessed set of attributes to select accessible data from the received data, the attributes comprise one or more indicators for selecting the accessible data; and presenting the selected accessible data on the graphical user interface.

13. The method of claim 12, wherein presenting the selected accessible data further comprises:

determining an amount of interaction of each of the selected accessible data over a predetermined period of time;

generating a list comprising the selected accessible data by automatically moving selected accessible data to a top of the generated list based on the determined amount of interaction; and providing the generated list on the graphical user interface.

14. The method of claim 11, wherein the set of attributes comprises permissions to access data associated with the target object.

15. The method of claim 11, wherein the set of attributes comprises a status of the user.

16. The method of claim 11, wherein the plurality of systems storing data updates data daily.

17. The method of claim 11, wherein the modified web page comprises a selectable element, the selectable element generates another user interface providing detailed data when the user configures the selectable element.

18. The method of claim 11, wherein the modified web page comprises sales data associated with the object.

19. The method of claim 11, wherein the modified web page comprises inventory data associated with the object.

20. A computer-implemented system implementing a web-browser plugin for providing requested information, the system comprising:

a first system storing inventory data;

a second system storing sales data;

one or more memory devices storing instructions; and one or more processors configured to execute the instructions to perform operations comprising:

receiving, as a user interaction on a graphical user interface, a request to provide data associated with a target object presented on a web page;

accessing a set of attributes associated with a user of a user device;

determining a data accessibility of the user based on the accessed set of attributes by parsing a permission incorporated in the received set of attributes;

retrieving an object identifier associated with the target object based on the determined data accessibility, the object identifier incorporated in the web page;

transmitting the retrieved object identifier to the first system and the second system, the first system and the second system configured to provide data corresponding to the received object identifier in response to the received object identifier;

providing the received data to the user device implemented in the web page;

parsing a permission incorporated in the accessed set of attributes to select accessible data from the received data, the attributes comprise one or more indicators for selecting the accessible data;

filtering the accessible data based on the set of attributes; and presenting the filtered accessible data on the graphical user interface.

* * * * *